(12) United States Patent
Ogura et al.

(10) Patent No.: US 6,291,962 B1
(45) Date of Patent: Sep. 18, 2001

(54) OFFSET CONTROL CIRCUIT AND OFFSET CONTROL METHOD

(75) Inventors: Yoichi Ogura; Shoji Marukawa, both of Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/504,868

(22) Filed: Feb. 16, 2000

(30) Foreign Application Priority Data

Feb. 17, 1999 (JP) ................................... 11-039060

(51) Int. Cl.[7] .................................................. G05B 11/36
(52) U.S. Cl. .................... 318/609; 318/568.22; 318/635; 318/636; 360/51
(58) Field of Search ............................. 318/609, 568.22, 318/635, 636; 375/4; 360/51, 31

(56) References Cited

U.S. PATENT DOCUMENTS

| | | | |
|---|---|---|---|
| 4,961,182 | * 10/1990 | Saito et al. | 369/124 |
| 5,052,022 | * 9/1991 | Nishita et al. | 375/4 |
| 5,677,802 | * 10/1997 | Saiki et al. | 360/51 |

FOREIGN PATENT DOCUMENTS 8-249606   9/1996   (JP) .

\* cited by examiner

Primary Examiner—Karen Masih
(74) Attorney, Agent, or Firm—Wenderoth, Lind & Ponack, L.L.P.

(57) ABSTRACT

When a playback signal of recorded data which is a DC free code has non-linearity, the playback signal is equalized by a waveform equalization unit, and sampled by an analog-to-digital converter. The sample data is binarized, and an offset amount is detected by utilizing the feature of the DC free code, and then the reference level of the analog-to-digital converter is controlled so that the output of a first integrator becomes 0. Thereafter, the output of a level shift circuit is input to a second integrator, and the level shift amount is controlled so that the output becomes 0. The converged value is retained. After this learning, by using the retained level shift amount, the reference level is controlled so that the output of the second integrator becomes 0, thereby performing speedy and accurate DC offset control.

13 Claims, 5 Drawing Sheets level fluctuation detector reference level control circuit 10

OFFSET CONTROL CIRCUIT AND OFFSET CONTROL METHOD

FIELD OF THE INVENTION

The present invention relates to an offset control circuit which can speedily and accurately control the DC level of a playback signal of digital data recorded on an optical disk, a magneto-optical disk, or a magnetic disk, even when the playback signal has non-linearity. The invention also relates to an offset control method using the offset control circuit.

BACKGROUND OF THE INVENTION

A magnetic disk unit is a kind of apparatus for recording and reproducing digital data. With the progress of high-density recording in recent years, a magneto-resistive head (MR head) has been increasingly employed as a playback head in the magnetic disk unit.

The MR head reads recorded data by utilizing the fact that the resistivity ρ of an MR element changes against the input magnetic field H from a magnetic recording medium.

The MR element uses, ideally, a linear area of a performance curve. Therefore, when an input signal, i.e., the recorded magnetic field, is positive-to-negative symmetric, an output signal also has an amplitude which is positive-to-negative symmetric.

However, when the bias point deviates, the MR element uses a non-linear area of the performance curve and, therefore, the output signal becomes positive-to-negative asymmetric. When the playback waveform is positive-to-negative asymmetric, it is difficult to specify the DC level of the playback signal.

Now, a conventional method for solving the above-mentioned problem will be described with reference to FIG. 6.

FIG. 6 is a block diagram illustrating a conventional apparatus for removing an offset of a signal by a field forward loop.

As shown in FIG. 6, an AC-coupled playback signal is equalized by a waveform equalization means 1, sampled by an analog-to-digital converter 2, and input to an offset detection circuit 26. The inner structure of the offset detection circuit 26 is shown in FIG. 7. The offset detection circuit 26 detects an amplitude error from the sampled signal. FIG. 8 is a waveform diagram for explaining the process of detecting an amplitude error from an input signal by the offset detection circuit 26.

To be specific, the offset detection circuit 26 includes a first delay circuit 29 for delaying an input signal S1 by T1/2 (T1: flux reversal width), and a first subtracter 30 for subtracting the output of the first delay circuit 29 from the input signal S1. The output S2 of the first subtracter 30 is a signal from which the offset is removed.

The offset detection circuit 26 further includes a second delay circuit 31 for delaying the output S2 of the first subtracter 30 by T1/2, an adder 32 for adding the output S2 of the first subtracter 30 and the output of the second delay circuit 31, and a decision circuit 33 for comparing the output S3 of the adder 32 with a predetermined threshold to generate a gate signal S4.

Further, the offset detection circuit 26 includes a second subtracter 34 for subtracting the output of the second delay circuit 31 from the output S2 of the first subtracter 30, and a selector 35 for selecting the output S5 of the second subtracter 34 by the gate signal S4. The output S6 of the selector 35 is an amplitude error signal indicating an amplitude error.

Turning to FIG. 6, the amplitude error signal output from the offset detection circuit 26 is input to a balancing circuit 27 which is a circuit for removing noise superposed on the head playback signal. A subtracter 28 subtracts the output of the balancing circuit 27 from the output of the analog-to-digital converter 2. In this way, the offset of the playback signal is compensated, i.e., the DC level of the playback signal is controlled.

However, in order to obtain an accurate amplitude error, the positive and negative components of the playback signal should not be interfered with. As a result, the operation to detect the amplitude errors is performed using a training signal prior to a data signal.

In the conventional offset compensation technique, a training signal having a known flux reversal width must be used to detect an accurate amplitude error and, therefore, it is difficult to compensate an offset for a playback signal having no training signal. Especially when a playback signal has an integral feature such as optical playback, it is very difficult to realize offset compensation.

Further, even when the conventional technique can be applied to a recorded data signal area, a problem of accuracy will occur if the sampling rate of the analog-to-digital converter is not several times as high as the bit rate.

In recent years, with the progress of high density recording, the PRML (Partial Response Maximum Likelihood) signal processing method has been adopted. This method is well suited for high density recording and playback in the linear direction.

In the PRML signal processing method, a playback signal is prompted to have an intentional waveform interference, and the playback signal is equalized to a band which is restricted so as to minimize the intensity of noise. Thereafter, according to a known interference rule, data demodulation is performed by using a maximum likelihood decoder which demodulates a sequence of highest likelihood.

When using the PRML signal processing method, by using a playback clock which is synchronized with the phase of a clock component possessed by the playback signal, multiple-bit sample data are generated. However, considering the power consumption or the operating speed, the sampling rate is desired to be approximate to the bit rate.

Further, with regard to the circuit structure, it is preferable to use digital elements which promise cost reduction by integration rather than analog elements which have element-to-element variations in characteristics, and deteriorate with age.

SUMMARY OF THE INVENTION

The present invention is made to solve the above-described problems and has for its object to provide an offset control circuit and an offset control method which can speedily and accurately control the DC level of a playback signal even when the playback signal has non-linearity, by using a digital playback signal which is sampled at a rate approximate to the frequency of a clock component possessed by the play back signal, even in a recorded data area, by utilizing both of the feature of the DC free code and the amplitude information.

It is another object of the present invention to provide an offset control circuit and an offset control method to which a method suited for high density recording and playback, such as the PRML signal processing method, can be applied easily.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an offset control circuit for controlling the DC level of a playback signal when recorded digital data is a DC free code having no DC components and the playback signal has non-linearity. This circuit comprises waveform equalization means for emphasizing a predetermined frequency band of the playback signal; an analog-to-digital converter for sampling the signal equalized by the waveform equalization means to multiple-bit digital data in accordance with a playback clock which is used for reading the signal as digital data; binarization means for binarizing the sampled signal; a converter for outputting opposite-pole values of the same absolute value on the basis of the binarized signal; a first integrator for integrating the output from the converter; a level shift circuit for entirely shifting the signal level sampled by the analog-to-digital converter; a second integrator for integrating the output signal from the level shift circuit; shift amount adjustment means for adjusting the shift amount of the level shift circuit on the basis of the output signal from the second integrator; switching means for selecting one of the output signal from the first integrator and the output signal from the second integrator, and outputting the selected signal; a reference level control circuit for controlling a reference level of the analog-to-digital converter on the basis of the output signal from the switching means; and a mode controller for switching the operation mode between a training mode and a normal operation mode.

In the training mode, the reference level is controlled so that the output from the first integrator becomes zero and, after the output from the first integrator converges to zero, in the state where the reference level is held, the shift amount adjustment means is controlled so that the output signal from the second integrator becomes zero, and a convergent value of the shift amount when the output signal from the second integrator is converted to zero is retained in the shift amount adjusting means.

In the normal operation mode, the reference level is controlled so that the output signal from the second integrator becomes zero, by using the value of the shift amount retained in the shift amount adjustment means, thereby controlling the DC level at high speed. Therefore, even when the playback signal has non-linearity, the DC level of the playback signal can be accurately controlled by using the digital playback signal which is sampled at a rate approximate to the frequency of the clock component of the playback signal, even in the recorded data area, by utilizing the feature of the DC free code. Further, by leaning the level shift amount when controlling the DC level from amplitude information by using the obtained DC level, DC level control using both of the level shift amount and the amplitude information can be performed in the normal operation mode, resulting in speedy and accurate control of DC level after seeking. Furthermore, as an advantage of digitalization, application of the PRML signal processing method to the offset control circuit is facilitated, thereby providing a system suited for high-density recording and playback.

According to a second aspect of the present invention, the above-described offset control circuit further comprises a level fluctuation detector for detecting a time-wise fluctuation of the DC level of the playback signal. When the level fluctuation detector decides that the fluctuation is small, the reference level is controlled on the basis of the output signal from the first integrator, and when the level fluctuation detector decides that the fluctuation is large, the reference level is controlled on the basis of the output signal from the second integrator. Thereby, in an area where the time-wise fluctuation of the DC level is small, high performance is assured although the response speed is low. Therefore, the data quality can be improved by applying control using the feature of the DC free code, which places great importance on accuracy. When the DC level is different from the normal level or when the time-wise fluctuation is large, the follow-up performance for a local response can be improved by applying control based on the amplitude information, which places great importance on control speed. In this way, optimum DC level control can be performed.

According to a third aspect of the present invention, in the above-described offset control circuit, the reference level control circuit includes adaptive control means which receives the output signals from the first and second integrators and adjusts amplification factors for the respective signals, and the reference level is controlled on the basis of the output from the adaptive control means, thereby adaptively controlling the DC level against non-linear distortions having different characteristics according to the locations. Therefore, even in the state where the DC level fluctuates with time due to difference in non-linearities at different positions in the recording medium or disturbance at playback, the DC level can be accurately controlled.

According to a fourth aspect of the present invention, there is provided an offset control method employed in an offset control apparatus for controlling the DC level of a playback signal when recorded digital data is a DC free code having no DC components and the playback signal has non-linearity, wherein the apparatus comprises a waveform equalization device, an analog-to-digital converter, a binarization device, a converter, first and second integrators, a level shift circuit, a shift amount adjustment device, a switching device, a reference level control circuit, and a mode controller, the offset control method comprising: equalizing, using the waveform equalizing device, a predetermined frequency band of the playback signal; sampling, using the analog to digital converter, the signal equalized to multiple-bit digital data in accordance with a playback clock which is used for reading the signal as digital data; binarizing the sampled signal; outputting, using the converter, opposite-pole values of the same absolute value on the basis of the binarized signal; integrating, using the first integrator, the output from the converter; entirely shifting, using the level shift circuit, the signal level sampled by the analog-to-digital converter; integrating, using the second integrator, the output signal from the level shift circuit; adjusting, using the shift amount adjustment device, the shift amount of the level shift circuit on the basis of the output signal from the second integrator; selecting, using the switching device, one of the output signal form the first integrator and the output signal from the second integrator, and outputting the selected signal; controlling, using the reference level control circuit, a reference level of the analog-to-digital converter on the basis of the output signal from the switching device; and switching, using the mode controller, an operation mode between a training mode and a normal operation mode; wherein, in the training mode, the reference level is controlled so that the output from the first integrator converges to zero, in the state where the reference level is held, the shift amount adjustment device is controlled so that the output signal from the second integrator becomes zero, and a convergent value of the shift amount, when the output signal from the second integrator is converted to zero, is retained in the shift amount adjusting device; and wherein, in the normal operation mode, the reference level is controlled so that the output signal from the second integrator becomes zero, by using the value of the shift amount retained in the shift amount adjustment device, thereby controlling the DC level at high speed. Therefore, even when the playback signal has non-linearity, the DC level of the playback signal can be accurately controlled by using the digital playback signal which is sampled at a rate approximate to the frequency of the clock component of the playback signal, even in the recorded data area, by utilizing the feature of the DC free code. Further, by learning the level shift amount when controlling the DC level from amplitude information by using the obtained DC level, DC level control using both of the level shift amount and the amplitude information can be performed in the normal operation mode, resulting in speedy and accurate control of DC level after seeking. Furthermore, as an advantage of digitalization, application of the PRML signal processing method to the offset control circuit is facilitated, thereby providing a system suited for high-density recording and playback.

According to a fifth aspect of the present invention, in the above-described offset control method, the offset control apparatus further comprises a level fluctuation detector for detecting a time-wise fluctuation of the DC level of the playback signal, the offset control method further comprising: controlling the reference level on the basis of the output signal from the first integrator when the level fluctuation detector decides that the fluctuation is small; and controlling the reference level on the basis of the output signal from the second integrator when the level fluctuation detector decides that he fluctuation is large. Thereby, in an area where the time-wise fluctuation of the DC level is small, high performance is assured although the response speed is low. Therefore, the data quality can be improved by applying control using the feature of the DC free code, which places great importance on accuracy. When the DC level is different from the normal position or when the time-wise fluctuation is large, the follow-up performance for a local response can be improved by applying control based on the amplitude information, which places great importance on control speed. In this way, optimum DC level control can be performed.

According to a sixth aspect of the present invention, in the above-described offset control method, the reference level control circuit comprises an adaptive control device which receives the output signals from the first and second integrators, and adjusts amplification factors for the respective signals, the offset control method further comprising: controlling the reference level on the basis of the output from the adaptive control device, thereby adaptively controlling the DC level against non-linear distortions having different characteristics according to the locations. Therefore, the DC level can be accurately controlled even when the DC level fluctuates time-wise due to difference in non-linearities depending on locations, which is caused by that writing is performed with devices of different conditions on a rewriteable recording medium or the like, or disturbance at playback.

DETAILED DESCRIPTION OF THE PREFERRED EMBODIMENTS

Embodiment 1

Hereinafter, an offset control circuit and an offset control method according to a first embodiment of the present invention will be described with reference to FIGS. 1–3.

Figure 1:
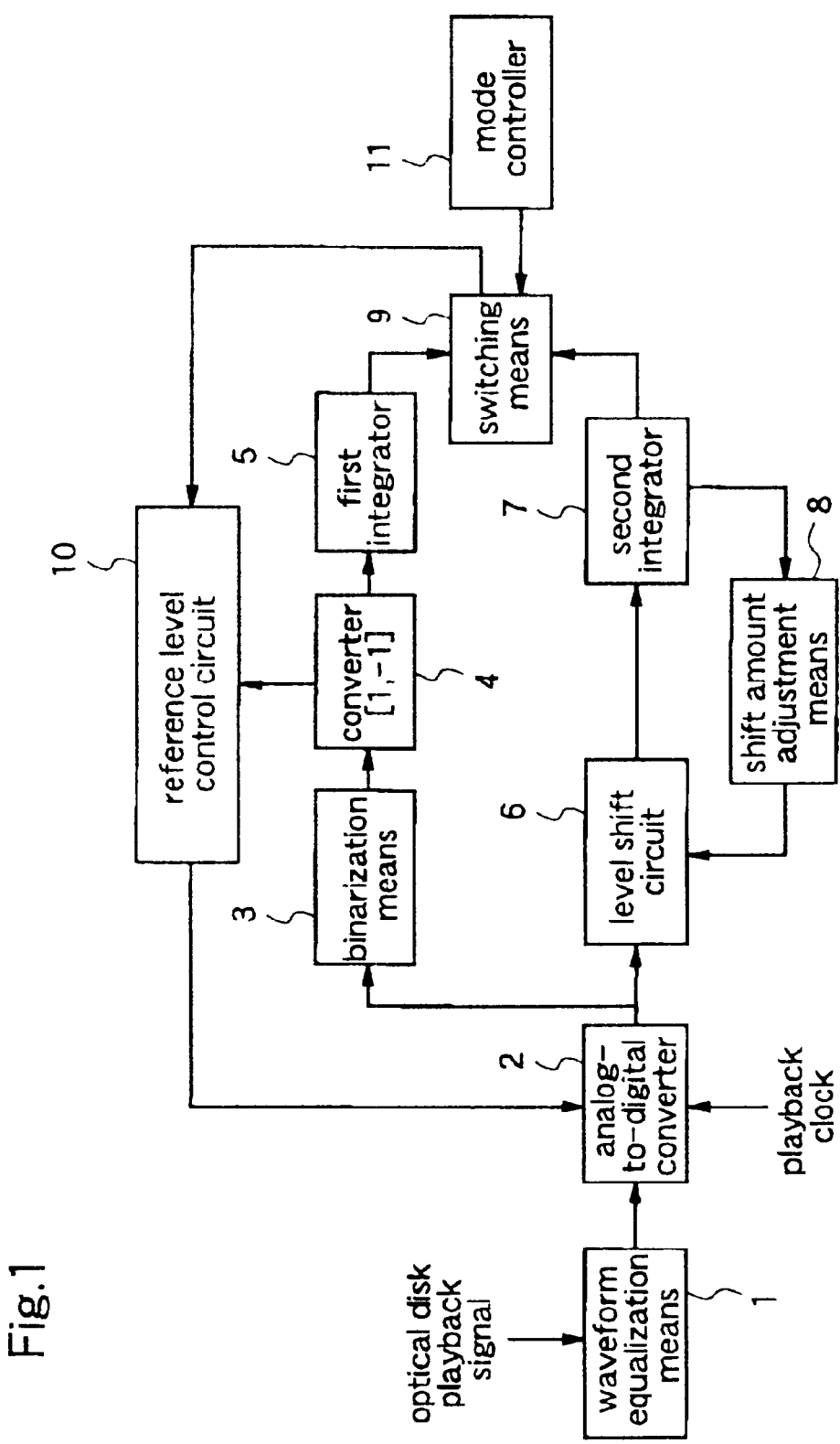
FIG. 1 is a block diagram illustrating the structure of an offset control circuit according to a first embodiment of the present invention.

FIG. 1 is a block diagram illustrating an offset control circuit according to the first embodiment of the present invention.

In this first embodiment, it is premised that, when a playback signal has an integral feature, the playback signal comprises a code in which a recorded data area, wherein continuous digital data "1" or "0" are restricted to 3T (T: minimum recording unit)–11T, exists continuously while a training area and an area wherein a single pattern (VFO pattern) is repeated do not exist, like a 8–16 modulated code in a DVD-ROM (Read only Memory).

The 8–16 modulated code is a code modulated such that the likelihood of existence of "1" as recorded data is equal to the likelihood of existence of "0" as recorded data, and this code is a DC free code having no DC component as frequency characteristics of the code itself.

Further, a signal read from an optical disk is apt to have a non-linear distortion. Especially, positive-to-negative asymmetry (hereinafter referred to simply as "asymmetry") appears remarkably.

Hereinafter, the cause of such asymmetry on an optical disk playback signal will be described with reference to FIG. 2.

Figure 2:
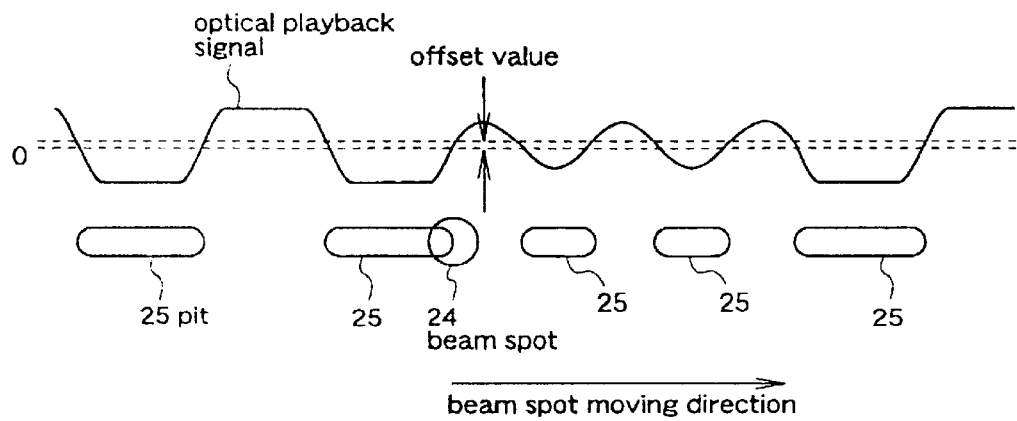
FIG. 2 is a diagram for explaining the cause of asymmetry of a playback signal in an optical disk.

As shown in FIG. 2, during optical playback, a beam spot 24 scan tracks where data are recorded. When the beam spot 24 passes a region where no pit 25 is formed, the reflectivity of the light beam is strong. When the light spot 24 passes a region where a pit 25 is formed, the reflectivity is weak. So, the time-wise integrated value of the intensity distribution of these reflected light beams is converted to an electric signal.

When the pits 25 are accurately formed according to the data recording length, no asymmetry occurs. However, each pit 25 is not a perfect rectangle in shape, and both edges are rounded. Further, the shorter the recording length is, the more formation of pits 25 becomes difficult, and thereby some error occurs.

Therefore, the deviation of pit edges in integration of reflected light is remarkable when the recording length is as short as 3T–5T, and asymmetry appears in the playback waveform. In contrast with this, when the recording length is longer than 6T, the integrated value is saturated or reaches the base, whereby the influence becomes small.

As described above, the shorter the recording length is, the higher the probability of asymmetry is. As a result, it should be thought that the DC level possessed by the waveform of 3T–5T dominates the DC level of the playback waveform. That is, since the degree of asymmetry depends on the condition at recording, if the DC level of the playback signal is not accurately controlled, clock generation and data demodulation are also adversely affected.

Turning to FIG. 1, an optical disk playback signal is compensated so that its high frequency band is equalized, by using a waveform equalization means 1. The waveform equalization means 1 is composed of a filter which can arbitrarily set a burst amount and a cutoff frequency, such as a high-level ripple filter.

The output signal from the waveform equalization means 1 is input to an analog-to-digital converter 2 for converting an analog signal to a digital signal, wherein the input signal is sampled to a multiple-bit digital signal by using a playback clock which is synchronized with the phase of a clock component possessed by the playback signal.

The multiple-bit digital signal output from the analog-to-digital converter 2 is input to a binarization means 3 for representing the digital signal by the two digits 0 and 1. When the phase is adjusted so that the sampled data converge to the zero level, i.e., when the PRML signal processing method is applied, the process of 1+D (D: delay of sampling time width) may be inserted in the input part, as a component of the binarization means 3.

The binarized signal is input to a converter 4 for outputting opposite-pole values having the same absolute value, on the basis of the input data. The converter 4 may be constructed such that it outputs −1 when the input signal is 1, and outputs 1 when the input signal is 0.

The output signal from the converter 4 is input to a first integrator 5, wherein it is integrated. When the recorded data is a DC free code, a DC level at which the output signal from the first integrator 5 becomes 0 is decided as an accurate DC level.

On the other hand, the signal sampled by the analog-to-digital converter 2 is input to a level shift circuit 6 for entirely shifting the level, and the level-shifted signal is input to a second integrator 7 to be integrated. When the playback waveform is positive-to-negative symmetric, the output signal from the second integrator 7 becomes 0 without level shifting.

The shift amount of the level shift circuit 6 is set by a shift amount adjustment means 8, on the basis of the output signal from the second integrator 7.

A switching means 9 selects one of the output signal of the first integrator 5 and the output signal of the second integrator 7, and outputs the selected signal. Based on the output signal from the switch 9, a reference level control circuit 10 controls the reference level of the analog-to-digital converter 2, whereby the DC level after sampling is controlled.

When the DC level is controlled by using the output signal from the first integrator 5, high-speed operation cannot be achieved because the data to be referred to has only the resolution for the sampling frequency and the time constant is large.

On the other hand, when the DC level is controlled by using the output signal from the second integrator 7, the time constant is small and therefore high-speed operation is achieved. However, when asymmetry exists, an accurate DC level cannot be specified.

As means to solve the above-described problems, a training mode and a normal operation mode are set. Hereinafter, these modes will be described using FIG. 3.

Figure 3:
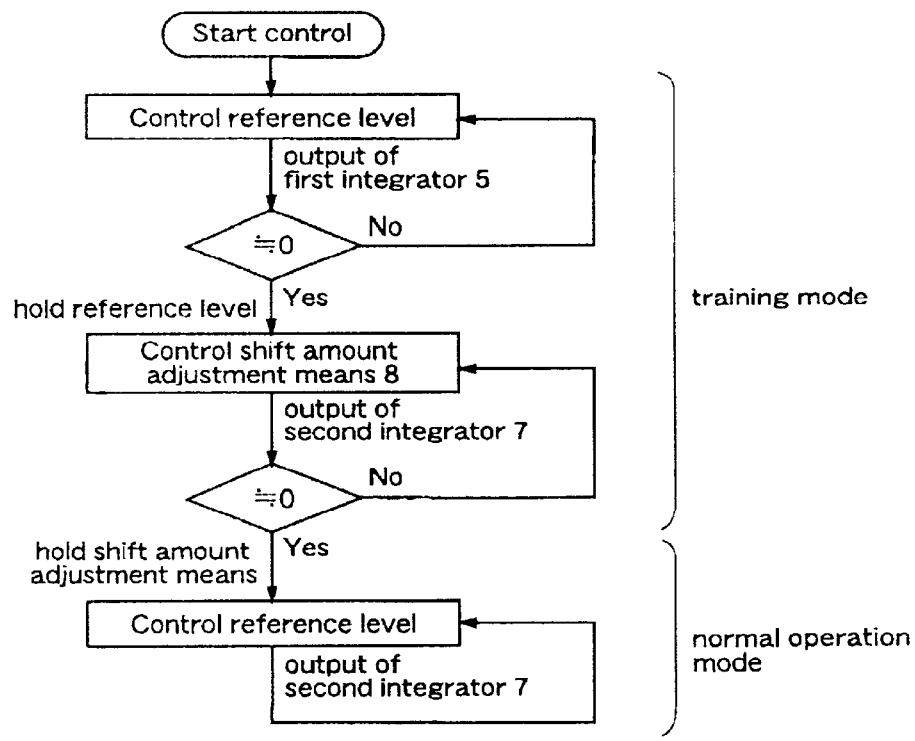
FIG. 3 is a flowchart illustrating the flow of control in the offset control circuit according to the first embodiment.

With reference to FIG. 3, in the training mode, initially the reference level of the analog-to-digital converter 2 is controlled so that the output signal from the first integrator 5 becomes 0. The DC level of the playback waveform, at which the output signal from the first integrator 5 converges to 0, is a normal level.

In this state, the reference level of the analog-to-digital converter 2 is held, and the shift amount adjustment means 8 is controlled so that the output signal from the second integrator 7 becomes 0. The shift amount, at which the output signal from the second integrator 7 converges to 0, is held in the shift amount adjustment means 8.

Next, in the normal operation mode, by using the value held in the shift amount adjustment means 8, the reference level of the analog-to-digital converter 2 is controlled so that the output signal from the second integrator 7 becomes 0, thereby controlling the DC offset level at high speed.

A mode controller 11 is provided as means for switching the operation mode between the training mode and the normal operation mode.

According to a series of operations described above, even when the playback signal has non-linearity, the DC level of the playback signal can be accurately controlled by using the digital playback signal which is sampled at a rate approximate to the frequency of the clock component possessed by the playback signal, even in the recorded data area, by utilizing the feature of the DC free code. Further, by learning the level shift amount when controlling the DC level from the amplitude information by using the obtained DC level, DC level control using both the level shift amount and the amplitude information can be performed in the normal operation mode, resulting in quick and accurate control of the DC level after seeking.

Further, as an advantage of digitization, application of the PRML signal processing method is facilitated, thereby providing a system suitable for high-density recording and playback.

Embodiment 2

Hereinafter, an offset control circuit according to a second embodiment of the present invention will be described with reference to FIG. 4.

The offset control circuit of this second embodiment has a level fluctuation detector for detecting a time-wise fluctuation in the DC level of a playback signal, in the reference level control process of the analog-to-digital converter 2 described for the first embodiment. When the level fluctuation detector decides that the fluctuation is small, the reference level of the analog-to-digital converter 2 is controlled on the basis of the output signal from the first integrator 5. When the level fluctuation detector decides that the fluctuation is large, the reference level of the analog-to-digital converter 2 is controlled on the basis of the output signal from the second integrator 7.

Figure 4:
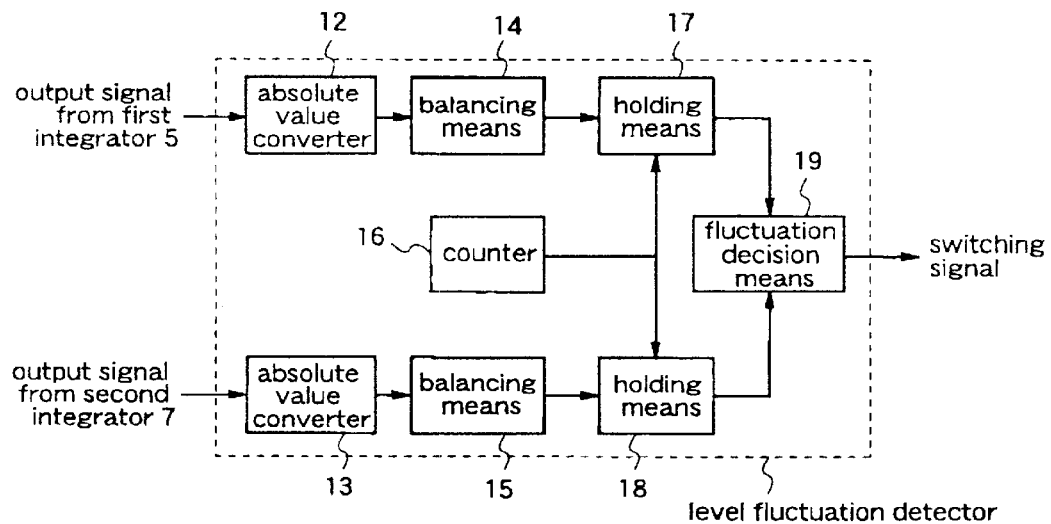
FIG. 4 is a block diagram illustrating the structure of a level fluctuation detector according to a second embodiment of the present invention.

The structure of the level fluctuation detector is shown in FIG. 4.

With reference to FIG. 4, the level fluctuation detector comprises absolute value converters 12 and 13 for receiving the output signals from the first integrator 5 and the second integrator 7, respectively, and converting these signals to absolute values; balancing means 14 and 15 for balancing the absolute values; a counter 16 for counting predetermined periods; holding means 17 and 18 for holding the outputs from the balancing means 14 and 15 for each predetermined period counted by the counter 16; and a fluctuation decision means 19 for detecting fluctuations from the outputs of the holding means 17 and 18 and outputting a switching signal. The switching means 9 (see FIG. 1) selects one of the output signals from the first integrator 5 and the second integrator 7 on the basis of the switching signal output from the level fluctuation detector, and outputs the selected signal to the reference level controller 10.

Since the level fluctuation detector is so constructed, in an area where the time-wise fluctuation of the DC level is small, high performance is assured although the response speed is low. Therefore, the data quality can be improved by applying control using the feature of the DC free code which places great importance on accuracy (using the output signal from the first integrator 5). When the DC level is different from the normal level or when the time-wise fluctuation is large, the follow-up performance for a local response is improved by applying control based on the amplitude information which places great importance on control speed (using the output signal from the second integrator 7). In this way, optimum DC level control can be performed.

Embodiment 3

Hereinafter, an offset control circuit according to a third embodiment of the present invention will be described.

Figure 5:
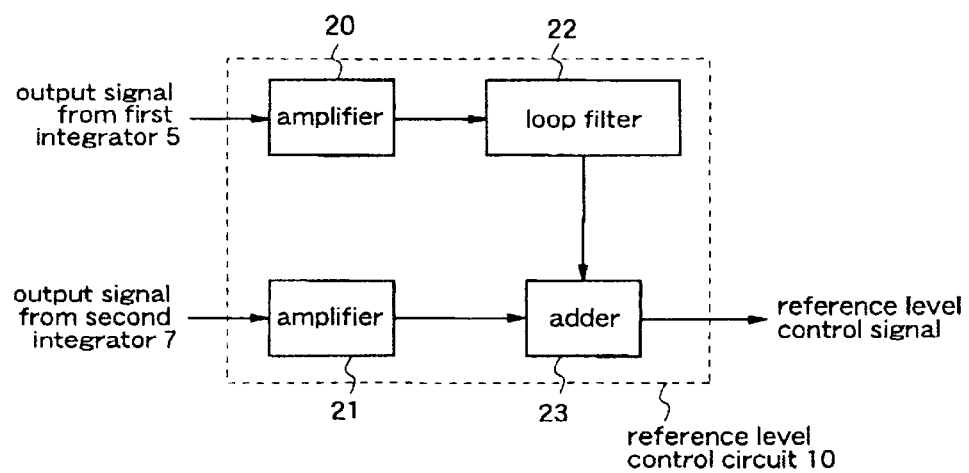
FIG. 5 is a block diagram illustrating the structure of a reference level controller according to a third embodiment of the present invention.
Figure 6:
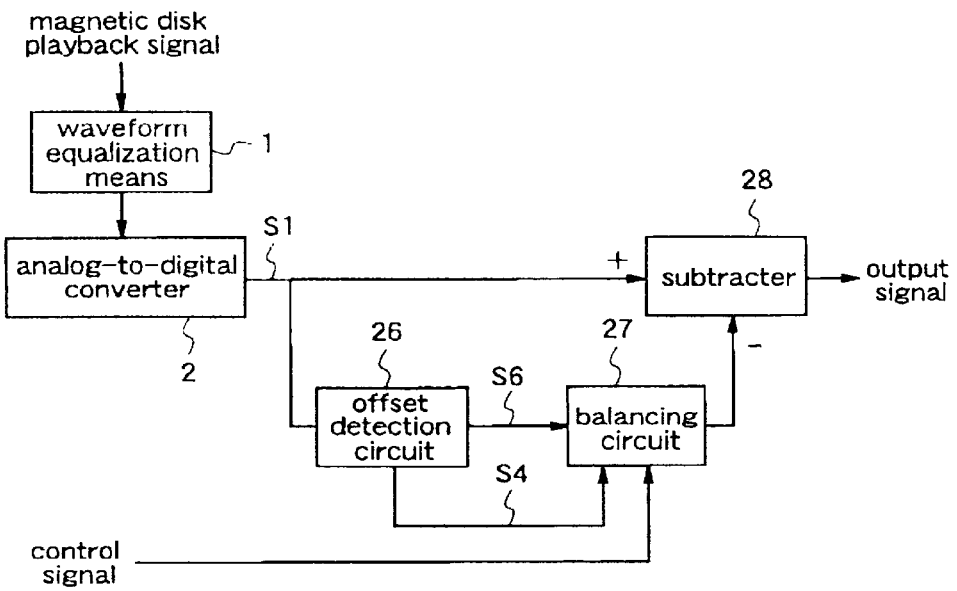
FIG. 6 is a block diagram illustrating the structure of an offset compensation circuit using a field forward loop according to the prior art.
Figure 7:
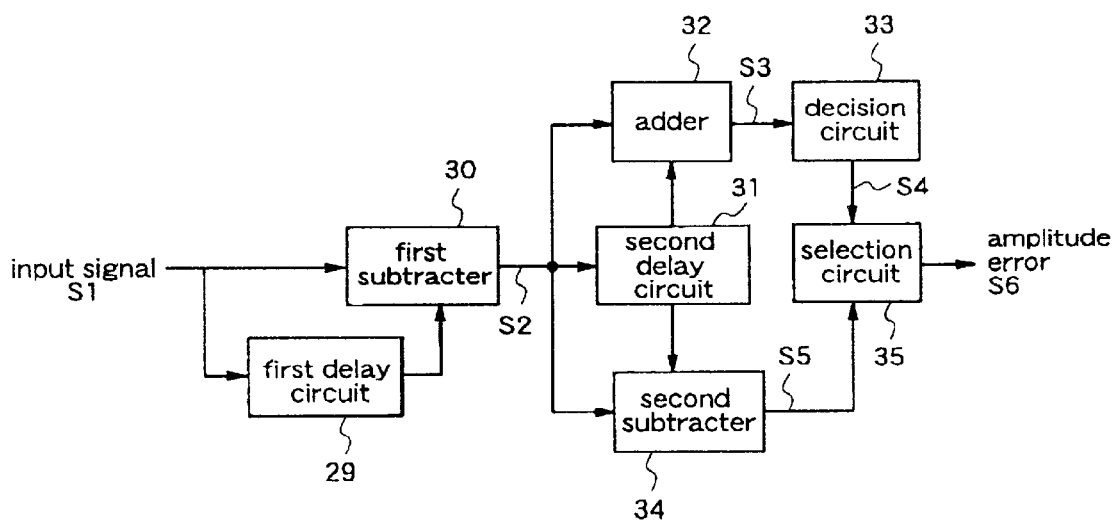
FIG. 7 is a block diagram illustrating the structure of an offset detector as a constituent of the offset compensation circuit shown in FIG. 6.
Figure 8:
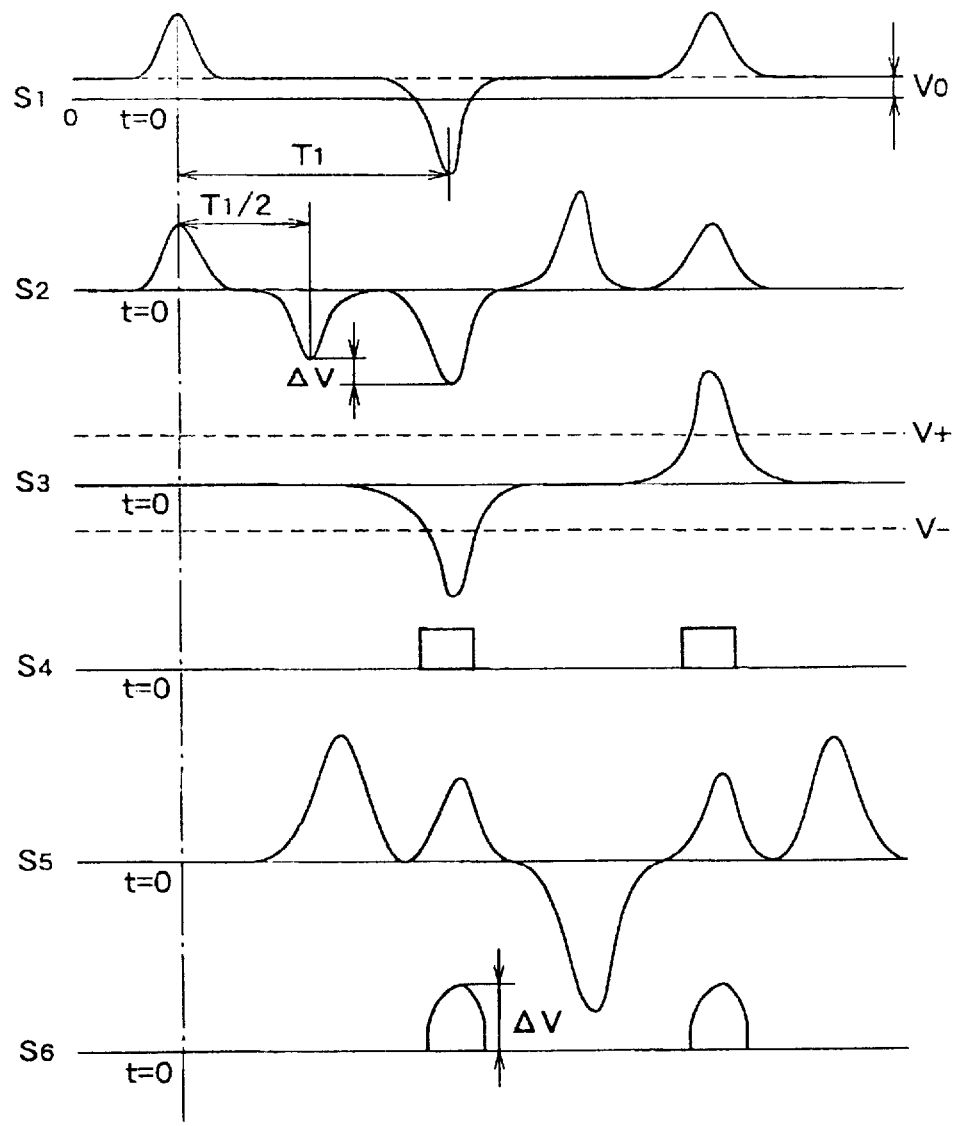
FIG. 8 is a waveform diagram for explaining the process of detecting an amplitude error from an input signal by using the offset detector shown in FIG. 7.

In the offset control circuit of this third embodiment, the reference level control circuit 10 described for the first embodiment is constructed as shown in FIG. 5.

With reference to FIG. 5, the reference level control circuit 10 comprises amplifiers 20 and 21 for receiving the output signals from the first integrator 5 and the second integrator 7, respectively, and adjusting the amplification factors for the respective signals; a loop filter 22 for receiving the output signal from the amplifier 20; and an adder 23 for adding the output signal from the amplifier 21 and the output signal from the loop filter 22.

The offset control circuit may be provided with means for controlling the reference level of the analog-to-digital converter 2 on the basis of the output from the reference level control circuit 10, thereby adaptively controlling the DC level against non-linear distortions having different characteristics according to the locations.

Thereby, the DC level can be accurately controlled even when the DC level fluctuates timewise due to difference in non-linearities depending on locations, which is caused by writing that is performed with devices of different conditions on a rewriteable recording medium or the like, or disturbance at playback.

What is claimed:

1. An offset control circuit for controlling a DC level of a playback signal when recorded digital data is a DC free code having no DC components and the playback signal has non-linearity, said offset control circuit comprising:
   a waveform equalization means for equalizing a predetermined frequency band of the playback signal;
   an analog-to-digital converter for sampling the signal equalized by said waveform equalization means to multiple-bit digital data in accordance with a playback clock which is used for reading the signal as digital data;
   a binarization means for binarizing the sampled signal;
   a converter for outputting opposite-pole values of the same absolute value on the basis of the binarized signal;
   a first integrator for integrating the output from said converter;
   a level shift circuit for entirely shifting the signal level sampled by said analog-to-digital converter;
   a second integrator for integrating the output signal from said level shift circuit;
   a shift amount adjustment means for adjusting the shift amount of the said level shift circuit on the basis of the output signal from said second integrator;
   a switching means for selecting one of the output signal from said first integrator and the output signal from said second integrator, and outputting the selected signal;
   a reference level control circuit for controlling a reference level of said analog-to-digital converter on the basis of the output signal from said switching means; and
   a mode controller for switching an operation mode between a training mode and a normal operation mode;
   wherein, in the training mode, the reference level is controlled so that the output from said first integrator becomes zero and, after the output from said first integrator converges to zero, in the state where the reference level is held, said shift amount adjustment means is controlled so that the output signal from said second integrator becomes zero, and a convergent value of the shift amount when the output signal from said second integrator is converted to zero is retained in said shift amount adjusting means; and
   wherein, in the normal operation mode, the reference level is controlled so that the output signal from said second integrator becomes zero by using the value of the shift amount retained in said shift amount adjustment means, thereby controlling the DC level at high speed.

2. An offset control circuit as claimed in claim 1, further comprising a level fluctuation detector for detecting a timewise fluctuation of the DC level of the playback signal;
   wherein, when said level fluctuation detector decides that the fluctuation is small, the reference level is controlled on the basis of the output signal from said first integrator; and
   wherein, when said level fluctuation detector decides that the fluctuation is large, the reference level is controlled on the basis of the output signal from said second integrator.

3. An offset control circuit as claimed in claim 1, wherein said reference level control circuit comprises an adaptive control means which receives the output signals from said first and second integrators, and adjusts amplification factors for the respective signals; and
   wherein the reference level is controlled on the basis of the output from said adaptive control means, thereby adaptively controlling the DC level against non-linear distortions having different characteristics according to the locations.

4. An offset control circuit as claimed in claim 2, wherein said level fluctuation detector comprises:
   first and second absolute value converters for receiving the output signals from said first and second integrators, respectively, and for converting the output signals to obtain absolute values;
   first and second balancing means for balancing the absolute values outputted from said first and second absolute value converters, respectively;

a counter for counting predetermined periods;

first and second holding means for holding the outputs from said first and second balancing means, respectively, for each predetermined period counted by said counter; and a fluctuation decision means for detecting fluctuations from the outputs of said first and second holding means and outputting a switching signal.

5. An offset control circuit as claimed in claim 1, wherein said reference level control circuit comprises:

first and second amplifiers for receiving the output signals from said first and second integrators, respectively, and for adjusting the amplification factors of the respective output signals;

a loop filter for receiving the output signal from said first amplifier; and an adder for receiving the output signal from said second amplifier and for adding the output signal from said second amplifier and the output signal from said loop filter.

6. An offset control circuit as claimed in claim 1, further comprising a level fluctuation detector operable to detect a time-wise fluctuation of the DC level of the playback signal;

wherein, when said level fluctuation detector decides that the fluctuation is small, the reference level is controlled on the basis of the output signal from said first integrator; and wherein, when said level fluctuation detector decides that the fluctuation is large, the reference level is controlled on the basis of the output signal from said second integrator.

7. An offset control circuit as claimed in claim 1, wherein said reference level control circuit comprises an adaptive control device which is operable to receive the output signals from said first and second integrators, and adjust amplification factors for the respective signals; and wherein the reference level is controlled on the basis of the output from said adaptive control device, thereby adaptively controlling the DC level against non-linear distortions having different characteristics according to the locations.

8. An offset control circuit as claimed in claim 6, wherein said level fluctuation detector comprises:

first and second absolute value converters operable to receive the output signals from said first and second integrators, respectively, and operable to convert the output signals to obtain absolute values;

first and second balancing devices operable to balance the absolute values outputted from said first and second absolute value converters, respectively;

a counter operable to count predetermined periods;

first and second holding devices operable to hold the outputs from said first and second balancing devices, respectively, for each predetermined period counted by said counter; and a fluctuation decision device operable to detect fluctuations from the outputs of said first and second holding devices and outputting a switching signal.

9. An offset control circuit for controlling a DC level of a playback signal when recorded digital data is a DC free code having no DC components and the playback signal has non-linearity, said offset circuit comprising:

a waveform equalization device operable to equalize a predetermined frequency band of the playback signal;

an analog-to-digital converter operable to sample the signal equalized by said waveform equalization device to multiple-bit digital data in accordance with a playback clock which is used for reading the signal as digital data;

a binarization device operable to binarize the sampled signal;

a converter operable to output opposite-pole values of the same absolute value on the basis of the binarized signal;

a first integrator operable to integrate the output from said converter;

a level shift circuit operable to entirely shift the signal level sampled by said analog-to-digital converter;

a second integrator operable to integrate the output signal from said level shift circuit;

a shift amount adjustment device operable to adjust the shift amount of said level shift circuit on the basis of the output signal from said second integrator;

a switching device operable to select one of the output signal from said first integrator and the output signal from said second integrator, and output the selected signal;

a reference level control circuit operable to control a reference level of said analog-to-digital converter on the basis of the output signal from said switching device; and a mode controller operable to switch an operation mode between a training mode and a normal operation mode;

wherein, in the training mode, the reference level is controlled so that the output from said first integrator becomes zero and, after the output from said first integrator converges to zero, in the state where the reference level is held, said shift amount adjustment device is controlled so that the output signal from said second integrator becomes zero, and a convergent value of the shift amount when the output signal from said second integrator is converted to zero is retained in said shift amount adjusting device; and wherein in the normal operation mode, the reference level is controlled so that the output signal from said second integrator becomes zero by using the value of the shift amount retained in said shift amount adjustment device, thereby controlling the DC level at high speed.

10. An offset control circuit as claimed in claim 9, wherein said reference level control circuit comprises:

first and second amplifiers operable to receive the output signals from said first and second integrators, respectively, and operable to adjust the amplification factors of the respective output signals;

a loop filter operable to receive the output signal from said first amplifier; and an adder operable to receive the output signal from said second amplifier and operable to add the output signal from said second amplifier and the output signal from said loop filter.

11. An offset control method employed in an offset control apparatus for controlling the DC level of a playback signal when recorded digital data is a DC free code having no DC components and the playback signal has non-linearity, wherein the offset control apparatus comprises a waveform equalization device, an analog-to-digital converter, a binarization device, a converter, first and second integrators, a level shift circuit, a shift amount adjustment device, a switching device, a reference level control circuit, and a mode controller, said offset control method comprising:

equalizing, using the waveform equalizing device, a predetermined frequency band of the playback signal;

sampling, using the analog-to-digital converter, the signal equalized by the waveform equalizing device to multiple-bit digital data in accordance with a playback clock which is used for reading the signal as digital data;

binarizing the sampled signal;

outputting, using the converter, opposite-pole values of the same absolute value on the basis of the binarized signal;

integrating, using the first integrator, the output from the converter;

entirely shifting, using the level shift circuit, the signal level sampled by the analog-to-digital converter;

integrating, using the second integrator, the output signal from the level shift circuit;

adjusting, using the shift amount adjustment device, the shift amount of the level shift circuit on the basis of the output signal from the second integrator;

selecting, using the switching device, one of the output signal form the first integrator and the output signal from the second integrator, and outputting the selected signal;

controlling, using the reference level control circuit, a reference level of the analog-to-digital converter on the basis of the output signal from the switching device; and switching, using the mode controller, an operation mode between a training mode and a normal operation mode;

wherein, in the training mode, the reference level is controlled so that the output from the first integrator becomes zero and, after the output from the first integrator converges to zero, in the state where the reference level is held, the shift amount adjustment device is controlled so that the output signal from the second integrator becomes zero and a convergent value of the shift amount, when the output signal from the second integrator is converted to zero, is retained in the shift amount adjusting device; and wherein, in the normal operation mode, the reference level is controlled so that the output signal from the second integrator becomes zero, by using the value of the shift amount retained in the shift amount adjustment device, thereby controlling the DC level at high speed.

12. An offset control method as claimed in claim 11, wherein the offset control apparatus further comprises a level fluctuation detector for detecting a time-wise fluctuation of the DC level of the playback signal, said offset control method further comprising:

controlling the reference level on the basis of the output signal from the first integrator when the level fluctuation detector decides that the fluctuation is small; and controlling the reference level on the basis of the output signal from the second integrator when the level fluctuation detector decides that he fluctuation is large.

13. An offset control method as claimed in claim 11, wherein the reference level control circuit comprises an adaptive control device which receives the output signals from the first and second integrators, and adjusts amplification factors for the respective signals, said offset control method further comprising:

controlling the reference level on the basis of the output from the adaptive control device, thereby adaptively controlling the DC level against non-linear distortions having different characteristics according to the locations.

* * * * *